(12) United States Patent
Faulkner et al.

(10) Patent No.: US 8,068,320 B2
(45) Date of Patent: Nov. 29, 2011

(54) NETWORK UNIT INCLUDING NETWORK TRANSFORMER AND NETWORK PROTECTOR

(75) Inventors: Mark A. Faulkner, Greenwood, SC (US); Rodney L. Spottsville, Simpsonville, SC (US); Jose L. Martinez, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 410 days.

(21) Appl. No.: 12/328,012

(22) Filed: Dec. 4, 2008

(65) Prior Publication Data

US 2010/0142108 A1 Jun. 10, 2010

(51) Int. Cl.
*H02H 7/00* (2006.01)
*H02B 7/00* (2006.01)

(52) U.S. Cl. .......................... 361/62; 361/620; 361/623

(58) Field of Classification Search ............... 361/62, 361/620, 623
See application file for complete search history.

(56) References Cited

U.S. PATENT DOCUMENTS

| | | | |
|---|---|---|---|
| 3,947,728 A | 3/1976 | Smith | |
| 4,017,698 A * | 4/1977 | Kuhn et al. | 200/50.21 |
| 4,943,448 A * | 7/1990 | Lacourciere | 427/58 |
| 5,278,723 A * | 1/1994 | Tanimizu | 361/611 |
| 5,467,241 A * | 11/1995 | Sugitani et al. | 361/63 |
| 5,822,165 A | 10/1998 | Moran | |
| 5,844,781 A | 12/1998 | Schlotterer et al. | |
| 6,215,654 B1 * | 4/2001 | Wilkie et al. | 361/605 |
| 6,407,897 B1 | 6/2002 | Yanniello et al. | |
| 6,504,693 B1 | 1/2003 | Moffat et al. | |
| 6,671,151 B2 | 12/2003 | Smith et al. | |
| 6,810,069 B2 * | 10/2004 | Kojovic et al. | 373/60 |
| 7,142,410 B2 * | 11/2006 | Norris et al. | 361/603 |
| 2006/0165023 A1 | 7/2006 | Faulkner et al. | |
| 2007/0110111 A1 * | 5/2007 | Shipp et al. | 372/29.021 |
| 2007/0156291 A1 * | 7/2007 | Curt et al. | 700/286 |
| 2007/0249319 A1 | 10/2007 | Faulkner et al. | |

* cited by examiner

*Primary Examiner* — Jared Fureman
*Assistant Examiner* — Scott Bauer
(74) *Attorney, Agent, or Firm* — Martin J. Moran (57) ABSTRACT

A network unit includes an enclosure having first and second compartments, plural input terminals, and a primary switch having an input and an output, the input being electrically connected to the input terminals. The output of the primary switch is electrically connected to the input of a network transformer. A network protector includes an input, an output and a circuit breaker electrically connected between the input and the output of the network protector. The network protector input is electrically connected to the network transformer output. Plural circuit protection devices are electrically connected between the network protector output and plural output terminals. The circuit breaker is substantially enclosed by the second compartment. The network transformer, the primary switch and part of the network protector are enclosed by the first compartment.

27 Claims, 7 Drawing Sheets

NETWORK UNIT INCLUDING NETWORK TRANSFORMER AND NETWORK PROTECTOR

BACKGROUND

1. Field

The disclosed concept pertains generally to network systems and, more particularly, to such network systems including a network transformer and a network protector.

2. Background Information

Low-voltage electrical power networks consist of interlaced loops or grid systems. These systems are supplied with electrical energy by two or more power sources, in order that the loss of any one power source does not result in an interruption of power. Such systems provide the highest level of reliability possible with conventional power distribution and are normally used to serve high-density load areas. Primary applications include, for example, central or downtown city areas, large buildings, shopping centers, and some industrial plants. These network systems can be of the grid type or spot type with three-phase three-wire or three-phase four-wire service at, for example, 208Y/120V or 480Y/277V.

Figure 1:
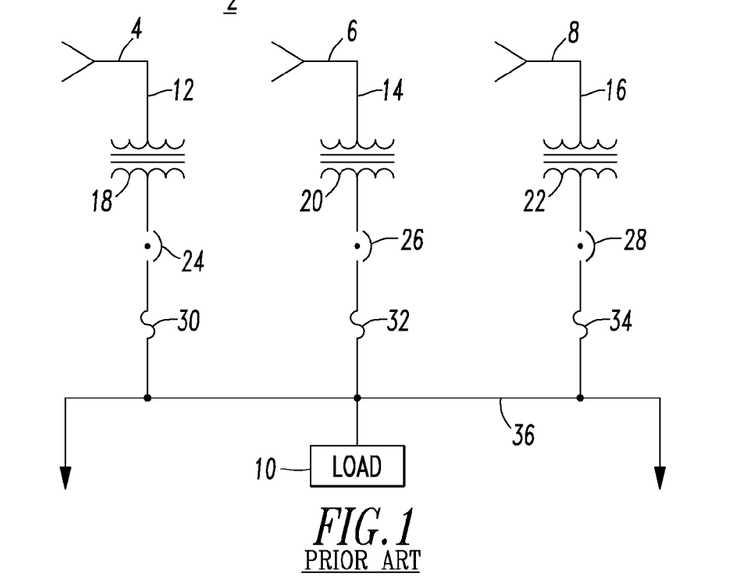
FIG. 1 is a block diagram in schematic form of a conventional network system.

As shown in FIG. 1, a conventional network system 2 includes a plurality of power sources 4,6,8 and a number of loads 10. Each power source 4,6,8 has a dedicated primary feeder 12,14,16 supplying the network (e.g., through a high voltage switch (not shown)), a network transformer 18,20,22, and a separate and distinct network protector 24,26,28, respectively. For simplicity of disclosure, each power source 4,6,8 is shown as having a single phase, although it is to be understood that each power source can have any number of phases (e.g., without limitation, three phases per primary feeder/network transformer/network protector). Each of the network protectors 24,26,28 includes a circuit breaker (not shown) and a network protector relay (or protective relay) (not shown). Fuses 30,32,34 are electrically connected between the outputs of the respective network protectors 24,26,28 and a network bus 36. The network protectors 24,26, 28 and/or the corresponding fuses 30,32,34 isolate the network transformers 18,20,22, respectively, from the network bus 36 (e.g., a low voltage collector bus) when a fault occurs in the corresponding one of the network transformers 18,20, 22 or the primary feeders 12,14,16.

Examples of network protector relays are disclosed in U.S. Pat. Nos. 3,947,728; 5,822,165; 5,844,781; 6,504,693; and 6,671,151. Network protector relays trip open a corresponding circuit breaker upon detection of power flow in the reverse direction.

Network transformers have a relatively difficult service and duty requirement. A network transformer typically serves loads that vary from almost zero to a maximum overload, withstands full short circuit conditions without damage to its windings, and generally has a relatively very small space constraint. Network transformers are supplied with a voltage that can range, for example, from about 4 kV to about 34.5 kV (wye or delta).

Figure 2:
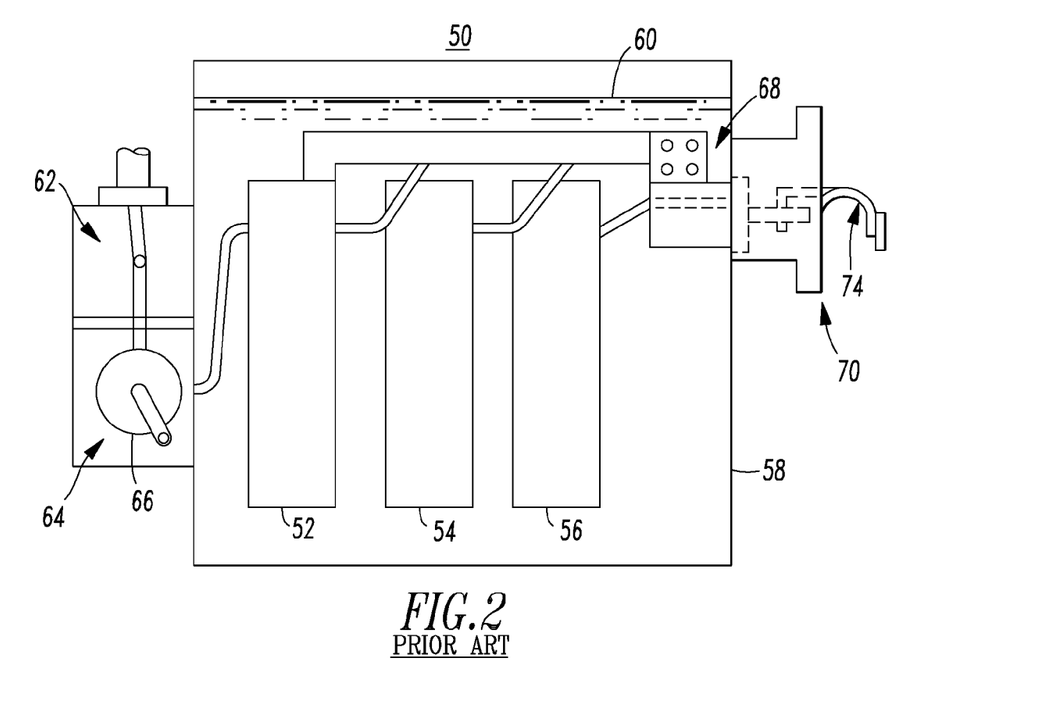
FIG. 2 is a simplified elevation section view of a network transformer.
Figure 3:
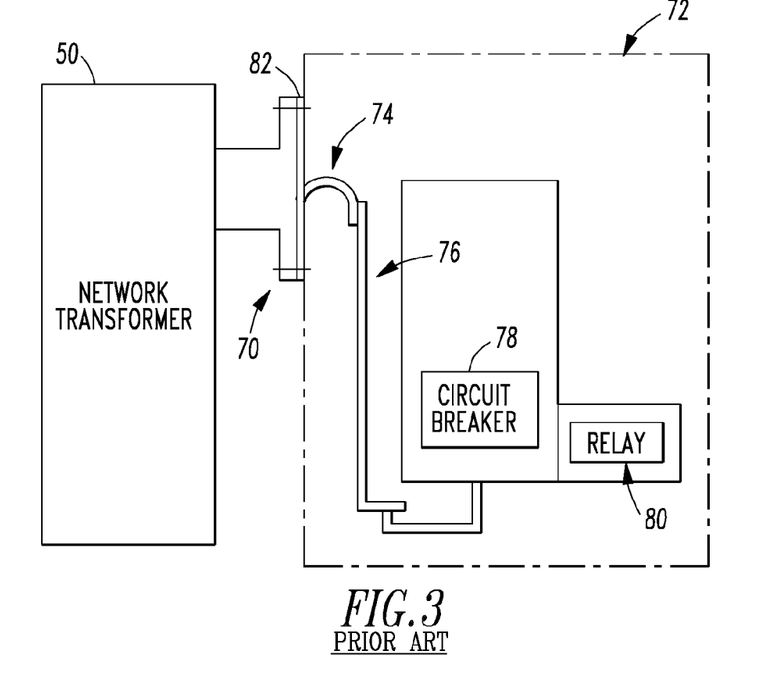
FIG. 3 is a simplified elevation section view of a network transformer and a network protector.

FIG. 2 shows a conventional three-phase network transformer 50 including three oil-filled chambers 52,54,56, a main tank 58 having an oil level 60, a termination chamber or high voltage terminal compartment 62, a high voltage switch compartment 64 (e.g., including a rotary, non-load breaking air switch 66), three-phase secondary bus work 68, and a mating throat 70 for engagement with a network protector 72 as is shown in FIG. 3. The mating throat 70 includes a flexible shunt 74 for electrical connection to network protector bus work 76 of FIG. 3. Each of the chambers 52,54,56 is separate and independent from the other chambers. Positive pressure can be applied in each of the chambers. The air switch 66 can be interlocked such that the network protector 72 is open, in order to remove the network transformer 50 without de-energizing the primary feeder (e.g., 12 of FIG. 1), and such that it can only be moved to a ground position when the network transformer 50 is de-energized. The network protector 72 also includes a circuit breaker 78 and a network protector relay 80.

Often, the network transformer 50 includes various instruments (not shown). For example, a top oil temperature gauge (not shown) indicates core temperature with white and red pointers. The white pointer indicates the current operating temperature and the red pointer indicates the highest prior or current operating temperature. An oil level gauge (not shown) is calibrated to indicate high, low and 25° C. oil levels.

Known network transformers and network protectors are two separate and distinct components, which are used together as part of a network system. For example, most utilities install a network transformer and a network protector together as a single unit. As shown in FIG. 3, a gasket 82 is disposed between the mating throat 70 of the network transformer 50 and the network protector 72, which are then bolted together. As such, this increases a dimension of the spot vault (not shown), which accommodates the combined length of both the network transformer 50 and the network protector 72.

Figure 4:
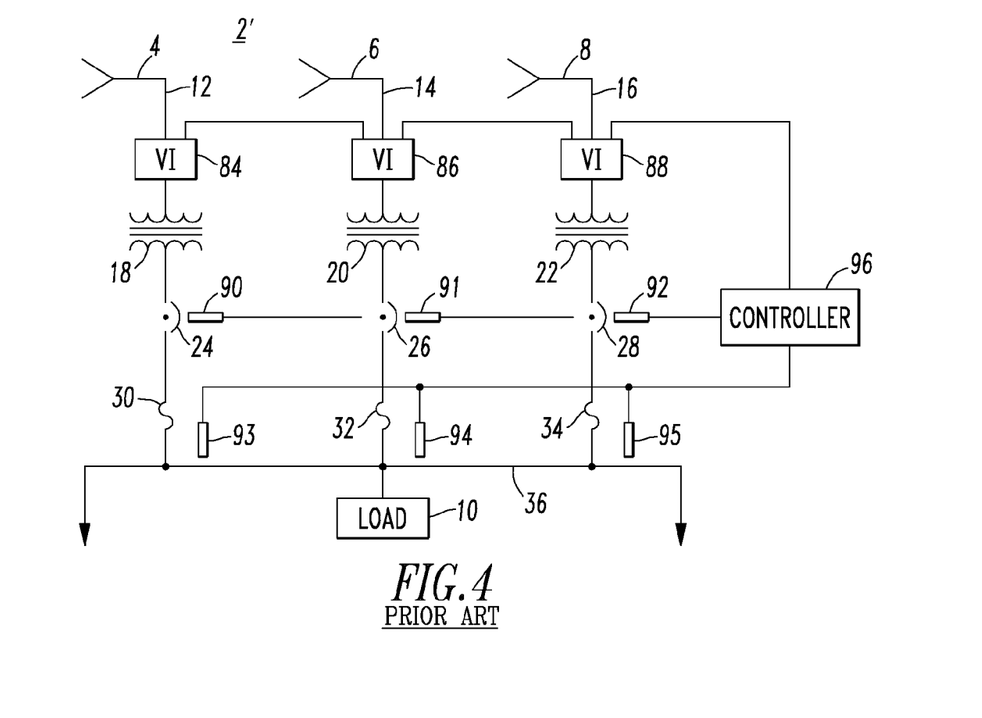
FIG. 4 is a block diagram in schematic form of a conventional spot network system including fire and ground fault detection.

In another network system 2', as shown in FIG. 4, some electric utilities add a separate vacuum interrupter (VI) switch 84,86,88 in 480 V spot vaults for ground fault and fire detection trip and lockout mechanisms in a spot network. Various sensors 90,91,92,93,94,95 (e.g., fire detectors and/or ground fault sensors) are disposed at the network protector outputs to the low voltage collector bus 36. These sensors 90-95 are monitored by a suitable controller 96 (e.g., without limitation, a programmable logic controller (PLC); a suitable processor), which controls the VI switches 84,86,88 upstream of the respective network transformers 18,20,22.

There is room for improvement in network systems including a network transformer and a network protector.

SUMMARY

These needs and others are met by embodiments of the disclosed concept, which provide a single network unit comprising a network transformer and a network protector. This provides synergies in terms of, for example, safe user access and bus work heat dissipation in a relatively small volume.

In accordance with one aspect of the disclosed concept, a network unit comprises: an enclosure comprising a first compartment and a second compartment; a plurality of input terminals; a primary switch comprising an input and an output, the input of the primary switch being electrically connected to the input terminals; a network transformer comprising an input and an output, the output of the primary switch being electrically connected to the input of the network transformer; a network protector comprising an input, an output and a circuit breaker electrically connected between the input and the output of the network protector, the input of the network protector being electrically connected to the output of the network transformer; a plurality of circuit protection devices; and a plurality of output terminals, the circuit protection devices being electrically connected between the output of the network protector and the output terminals, wherein the circuit breaker is substantially enclosed by the second compartment, and wherein the network transformer, the primary switch and part of the network protector are enclosed by the first compartment.

The enclosure may further comprise a third compartment; the network protector may further comprise a controller and a network protector relay enclosed by the third compartment; the controller may comprise a control panel enclosed by the third compartment; and the third compartment may be user accessible.

The circuit breaker may be a draw-out circuit breaker comprising a cassette disposed in the second compartment, the cassette including a plurality of stabs extending into the first compartment. The second compartment and the draw-out circuit breaker may be user accessible.

The enclosure may further comprise only three potential failure zones: a primary input at the input terminals; a network bus at the output terminals; and the second compartment for the circuit breaker.

The enclosure may further comprise a third compartment; the network protector may comprise a controller comprising a control panel enclosed by the third compartment; and the enclosure may further comprise only four potential failure zones: a primary input at the input terminals; a network bus at the output terminals; the second compartment for the circuit breaker; and the third compartment for the control panel.

The circuit breaker may comprise a cassette disposed in the second compartment, the cassette may include a plurality of stabs extending into the first compartment; the second compartment may be user accessible; and the control panel may be separated from the second compartment and may be structured to cause the circuit breaker to be drawn-out of the second compartment.

The input of the network protector may be electrically connected to the output of the network transformer by bus work; the first compartment may be structured to enclose the bus work; and the second compartment may be substantially isolated from the first compartment.

The input of the network protector may be electrically connected to the output of the network transformer by bus work; and the first compartment may be structured to enclose the bus work from the exterior of the enclosure.

The input of the network protector may be electrically connected to the output of the network transformer by first bus work; the output of the network protector may be electrically connected to the circuit protection devices by second bus work; and the first bus work and the second bus work may be electrically isolated by insulative encapsulation.

As another aspect of the disclosed concept, a network unit comprises: an enclosure comprising a first compartment and a second compartment; a plurality of input terminals; a network transformer comprising an input and an output, the input of the network transformer being electrically connected to the input terminals; a network protector comprising an input, an output and a circuit breaker electrically connected between the input and the output of the network protector, the input of the network protector being electrically connected to the output of the network transformer; a plurality of circuit protection devices; and a plurality of output terminals, the circuit protection devices being electrically connected between the output of the network protector and the output terminals, wherein the circuit breaker is substantially enclosed by the second compartment, and wherein the network transformer and part of the network protector are enclosed by the first compartment.

The enclosure may further comprise a third compartment; the network protector may comprise a controller comprising a control panel enclosed by the third compartment; the network protector may further comprise a network protector relay enclosed by the third compartment; and the enclosure may further comprise only four potential failure zones: a primary input at the input terminals; a network bus at the output terminals; the second compartment for the circuit breaker; and the third compartment for the control panel and the network protector relay.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a gateway; a server; a networked processor; a programmable logic controller (PLC); or any suitable processing device or apparatus.

As employed herein, the term "controller" means a processor.

The disclosed concept is described in association with a three-phase network unit, although the disclosed concept is applicable to network units having any number of phases.

For convenience of illustration, the inputs, interconnections and outputs among the various example three-phase components are shown with single lines, it being understood that these represent three-phase connections.

Figure 5:
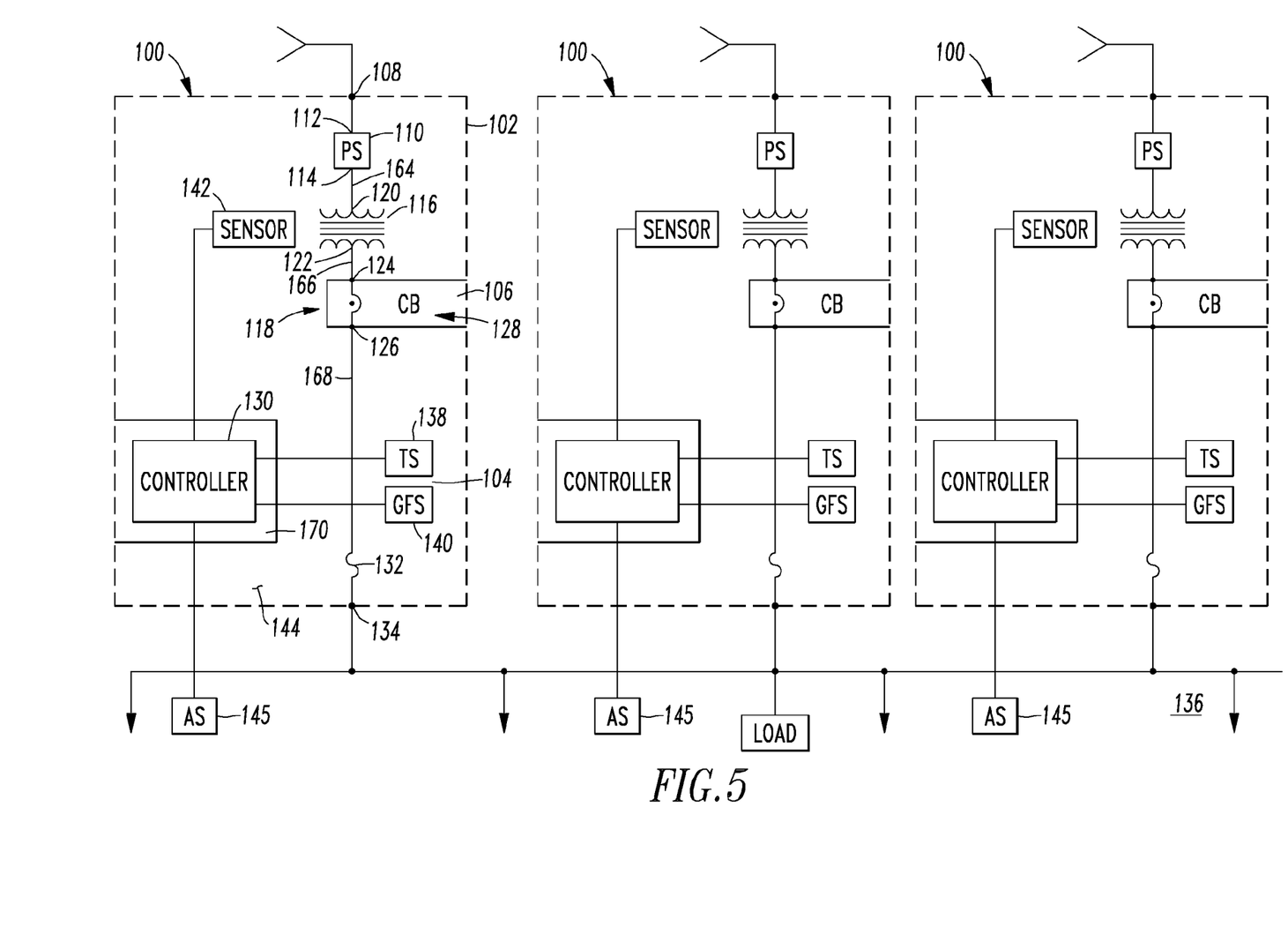
FIG. 5 is a block diagram in schematic form of a spot network system including three example network units in accordance with embodiments of the disclosed concept.
Figure 6:
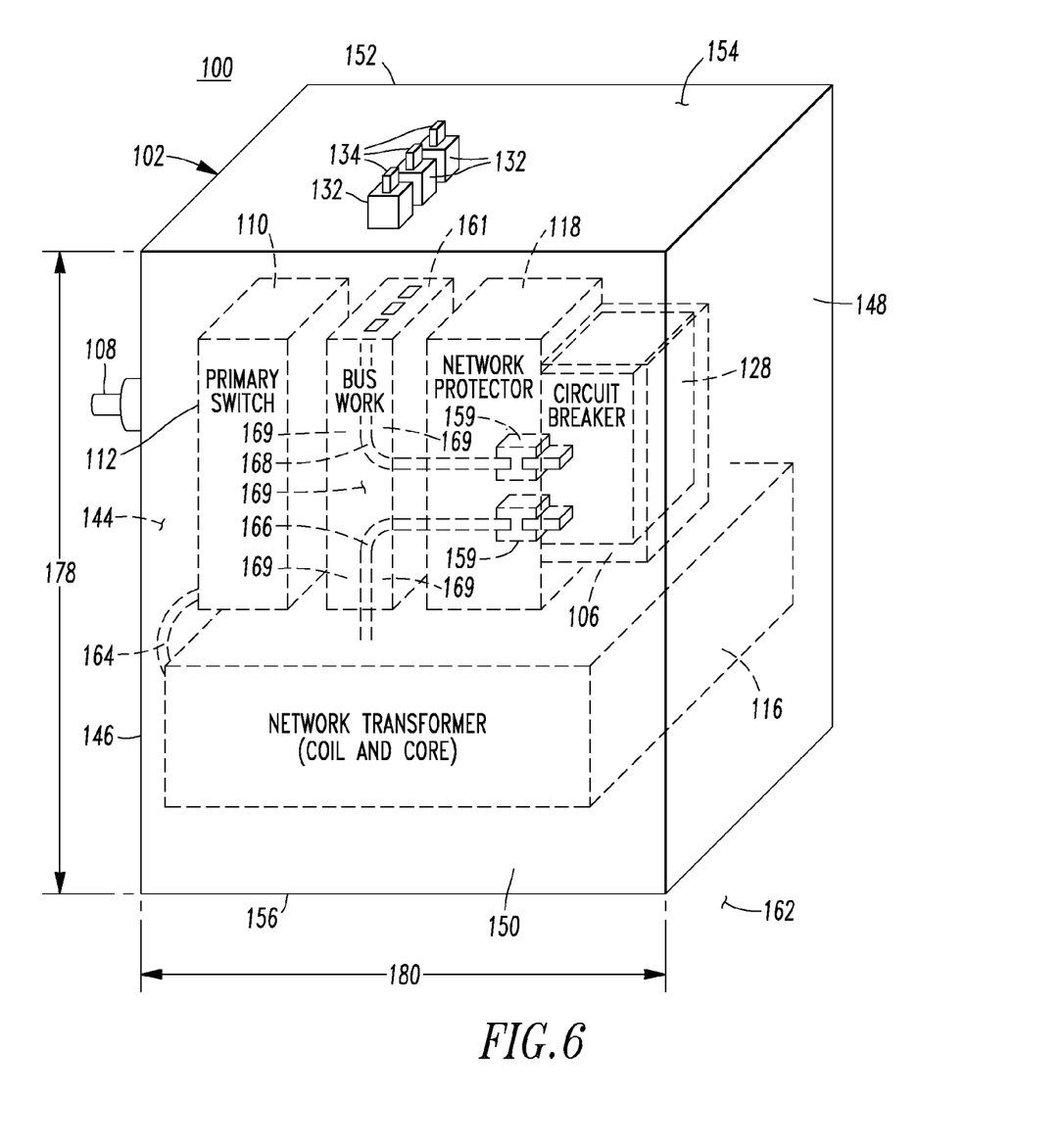
FIG. 6 is an isometric view of a network unit in accordance with another embodiment of the disclosed concept.
Figure 7:
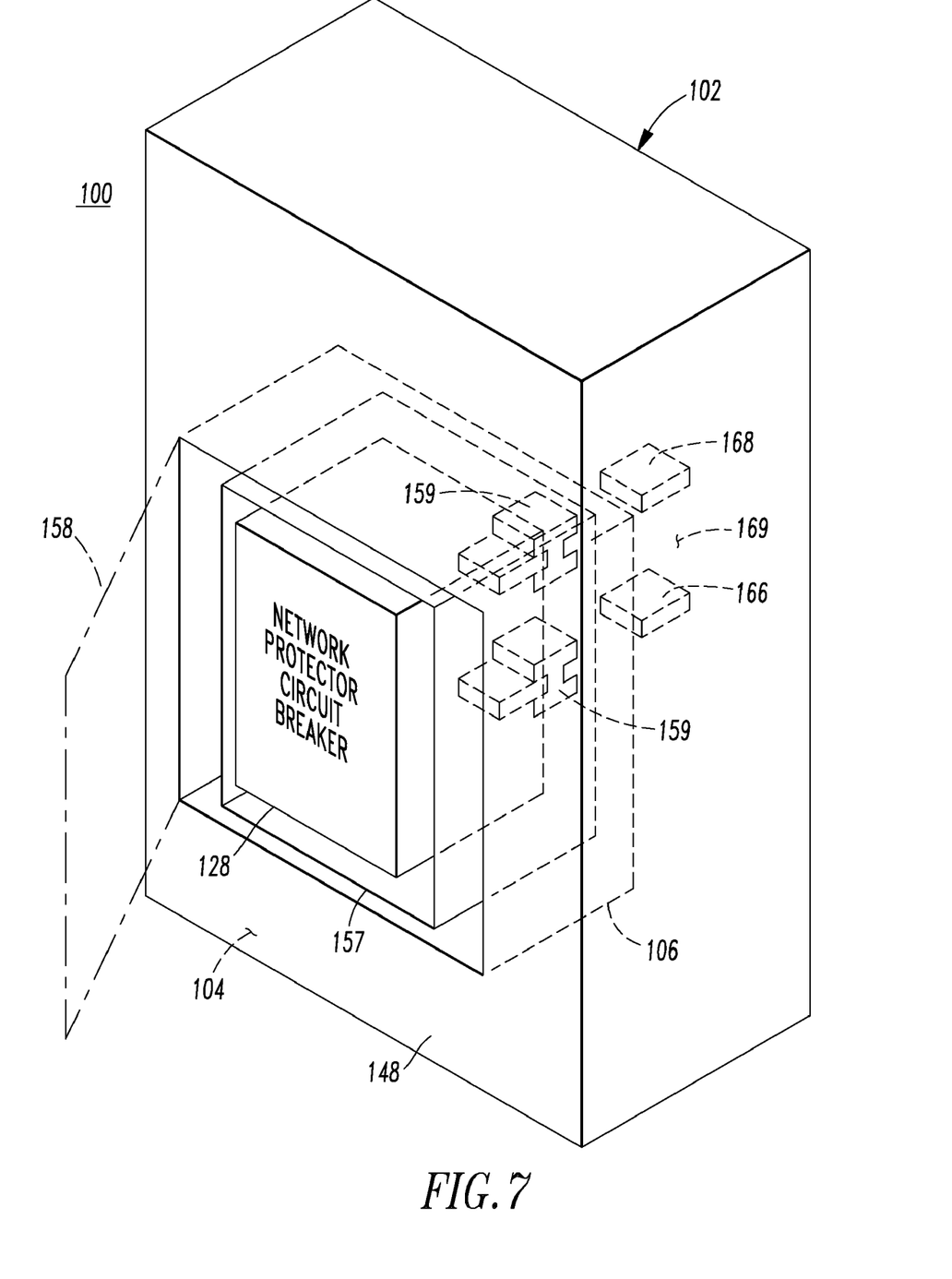
FIG. 7 is an isometric view as shown from one side of the network unit of FIG. 6.

Referring to FIGS. 5-7, a network unit 100 includes an enclosure 102 having a first compartment 104 and a second compartment 106, a plurality of input terminals 108, a primary switch (PS) 110 (e.g., without limitation, a vacuum circuit interrupter) having an input 112 and an output 114, a network transformer 116 and a network protector 118. The primary switch input 112 is electrically connected to the input terminals 108. The network transformer 116 includes an input 120 and an output 122. The primary switch output 114 is electrically connected to the network transformer input 120. The network protector 118 includes an input 124, an output 126 and a circuit breaker 128 electrically connected between the input 124 and the output 126 of the network protector 118. The network protector input 124 is electrically connected to the network transformer output 122. Preferably, the network protector 118 includes a controller 130 (also shown in FIG. 8), although the controller 130 is not required. A plurality of circuit protection devices 132 (e.g., without limitation, network fuses) are electrically connected between the network protector output 126 and a plurality of output terminals 134. The circuit breaker 128 is substantially enclosed by the second compartment 106. The network transformer 116, the primary switch 110 and part of the network protector 118 are enclosed by the first compartment 104.

EXAMPLE 1

FIG. 5 shows an example spot network system 136 including three example network units 100, although it will be appreciated that any suitable number of network units 100 can be employed in any suitable power distribution network or system.

EXAMPLE 2

As shown in FIG. 5, the optional controller 130 includes a number of temperature sensors (TS) 138 and/or a number of ground fault sensors (GFS) 140 enclosed by the first compartment 104 and/or a number of arc sensors (AS) 141. For example, the controller 130 is structured to trip open the circuit breaker 128 or the primary switch 110 responsive to a number of the temperature sensors 138 and/or the ground fault sensors 140 and/or the arc sensors 141.

EXAMPLE 3

The optional controller 130 includes a number of sensors 138,140,142 enclosed by the enclosure 102 and structured to sense a number of fire protection, oil level, oil pressure and oil temperature conditions. For example, the temperature and ground fault sensors 138,140 can sense a number of fire protection conditions, while a number of sensors 142 operatively associated with the network transformer 116 can sense network transformer oil level, oil pressure and oil temperature conditions.

EXAMPLE 4

The optional controller 130 is structured to generate an alarm or a control action to the circuit breaker 128 or the primary switch 110 responsive to the sensed conditions of Example 3.

EXAMPLE 5

Referring to FIG. 6, the network unit enclosure 102 includes an internal volume 144 defined by a first side 146, an opposite second side 148, a first end 150 disposed between the first side 146 and the opposite second side 148, an opposite second end 152 disposed between the first side 146 and the opposite second side 148 and opposite the first end 150, a top 154 disposed above the first side 146, the opposite second side 148, the first end 150 and the opposite second end 152, and a bottom 156 disposed below the first side 146, the opposite second side 148, the first end 150 and the opposite second end 152. The input terminals 108 are located on the first side 146, and the input 112 (FIG. 5) of the primary switch 110 is located within the internal volume 144 and proximate the first side 146. Preferably, as shown in FIG. 6, the network transformer 116 is below both of the primary switch 110 and the network protector 118.

EXAMPLE 6

The network protector 118 is located within the internal volume 144 and is proximate the opposite second side 148.

EXAMPLE 7

The network protector circuit breaker 128 is structured to be drawn-out of the opposite second side 148 as is best shown in FIG. 7.

EXAMPLE 8

The circuit protection devices 132 (e.g., network fuses) and the output terminals 134 (e.g., network protector bus) are preferably located proximate the enclosure top 154. In addition to the circuit protection devices 132, there can be an optional, non-load breaking, secondary disconnect (not shown) electrically connected in series with the devices 132 and the terminals 134.

EXAMPLE 9

The example enclosure 102 includes only three potential failure (e.g., without limitation, arc flash; water entry seal violation) zones: (1) a primary input at the input terminals 108 (only one input terminal 108 is shown, it being understood that there are three three-phase input terminals 108); (2) a network bus at the three three-phase output terminals 134; and (3) the second compartment 106 (FIG. 7) for the network protector circuit breaker 128.

EXAMPLE 10

Referring to FIG. 7, network protector circuit breaker 128 is a draw-out circuit breaker including a cassette 157 disposed in the user accessible second compartment 106, which has an access door 158 (shown open in phantom line drawing). The cassette 157 includes a plurality of stabs 159 (shown in hidden line drawing) extending into the first compartment 104. A control panel 174 (FIG. 8) for the controller 130 (FIG. 8) is separated from the second compartment 106 (FIG. 7) and is preferably structured to cause the circuit breaker 128 to be automatically drawn-out of the second compartment 106 (FIG. 7).

EXAMPLE 11

With reference to FIGS. 5 and 6, the input 124 of the network protector 118 is electrically connected to the output 122 of the network transformer 116 by bus work 161 (generally shown in FIG. 6). The first compartment 104 encloses the bus work 161 from the exterior 162 of the network unit enclosure 102.

EXAMPLE 12

The first compartment 104 is structured to enclose the bus work 161, and the second compartment 106 (FIG. 7) is substantially isolated from the first compartment 104.

EXAMPLE 13

The bus work 161 (FIG. 6), which is enclosed by the first compartment 104 of the enclosure 102, includes a first bus work 164 (FIG. 5), which electrically connects the output 114 of the primary switch 110 to the input 120 of the network transformer 116, a second bus work 166 (FIG. 5), which electrically connects the input 124 of the network protector 118 to the output 122 of the network transformer 116, and a third bus work 168 (FIG. 5), which electrically connects the output 126 of the network protector 118 to the circuit protection devices 132. Preferably, the electrical components of the bus work 161 are suitable encapsulated by insulative encapsulation 169 and, thereby, are electrically isolated from other such electrical components, the primary switch 110, the network protector 118 and the network transformer 146, any of which can have a different electrical potential.

EXAMPLE 14

At least the first bus work 164 and the second bus work 166 are within the internal volume 144 of the network unit enclosure 102.

EXAMPLE 15

Figure 8:
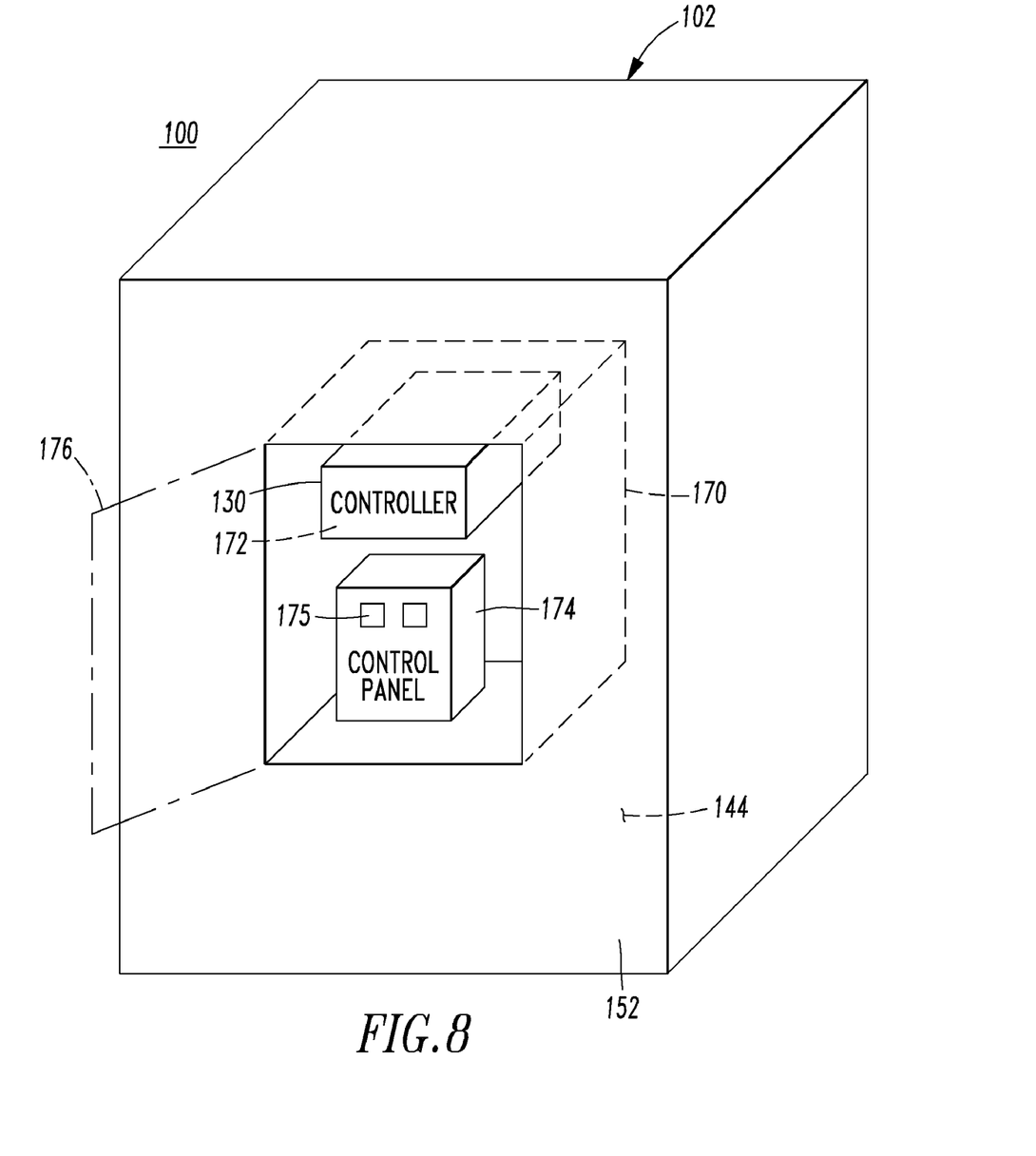
FIG. 8 is an isometric view as shown from one end of the network unit of FIG. 6.

As shown in FIGS. 5 and 8, the optional controller 130 is located within the internal volume 144 and is proximate the opposite second end 152 (FIG. 8).

EXAMPLE 16

The network unit enclosure 102 includes a third compartment 170. The network protector 118 includes a network protector relay 172 (e.g., without limitation, part of the controller 130) enclosed by the third compartment 170. The controller 130 includes a control panel 174 enclosed by the third compartment 170, which is user accessible through an access door 176 (shown open in phantom line drawing).

EXAMPLE 17

The controller control panel 174 is disposed on the opposite second end 152 as shown in FIG. 8.

EXAMPLE 18

The controller 130 provides the network protector relay 172 and can be implemented, for example and without limitation, by a programmable logic controller (PLC), a gateway or any other suitable processor.

EXAMPLE 19

If the controller 130 is disposed in the third compartment 170, then the network unit enclosure 102 includes only four potential failure (e.g., without limitation, arc flash) zones: (1) a primary input at the input terminals 108 (only one input terminal 108 is shown, it being understood that there are three three-phase input terminals 108); (2) a network bus at the three three-phase output terminals 134; (3) the second compartment 106 (FIG. 7) for the network protector circuit breaker 128; and (4) the third compartment 170 (FIG. 8) for the control panel 174, network protector relay 172 and controller 130.

EXAMPLE 20

Figure 9:
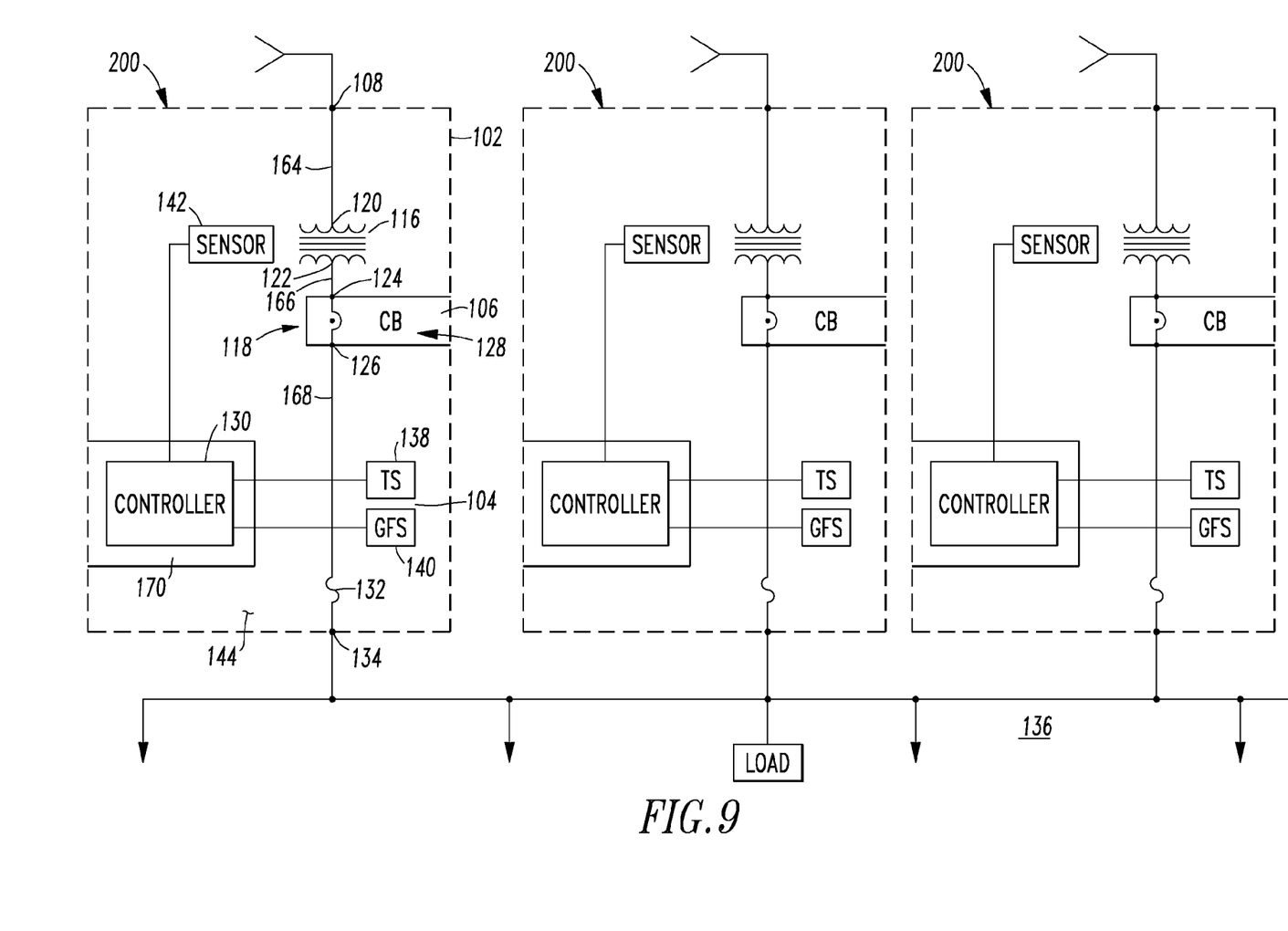
FIG. 9 is a block diagram in schematic form of a spot network system including three example network units in accordance with another embodiment of the disclosed concept.

Referring to FIG. 9, another network unit 200 is shown. This network unit 200 is similar to the network unit 100 of FIG. 5, except that the primary switch 110 is eliminated and the input 120 of the network transformer 116 is electrically connected to the input terminals 108. In this example, a suitable primary switch (not shown) can be provided upstream of the input terminals 108.

EXAMPLE 21

As in FIG. 8, the enclosure 102 of the network unit 200 can include the third compartment 170 for the optional controller 130 and the controller control panel 174.

EXAMPLE 22

The disclosed network units 100,200 eliminate the bolted throat and gasket connection between the network transformer 50 and the network protector 72 of FIG. 3. The network transformer 116 (FIGS. 5 and 6) is integrated within the network unit enclosure 102, thereby providing both power bus isolation and non-exposure to personnel. An access door (not shown) for the network protector 72 (FIG. 3) is eliminated and is replaced by an area-reduced access door 158 (FIG. 7) for the draw-out circuit breaker 128.

The disclosed network units 100,200 mitigate various potential failure zones (e.g., seal integrity mitigation is reduced from nine areas to only three or four area-reduced zones).

By using increased height 178 (FIG. 6), which can readily be accommodated in a spot vault (not shown), the reduced span 180 (FIG. 6) of the network unit 100 reduces the floor and wall space that would otherwise be occupied by four or five separately mounted devices (i.e., a primary vacuum interrupter, a network transformer, a network protector, a controller, and circuit protection devices and a secondary disconnect switch). For example, the reduced "footprint" takes advantage of wasted spaces in the separately mounted devices, while maximizing compartmental separation. The reduced "footprint" is accomplished by increasing height and by using the existing side-to-side size space voids that were present in the prior bolted network protector 72 and network transformer 50 of FIG. 3.

The network protector 118 and the primary switch 110 are advantageously located on opposite ends of the network unit 100. The network protector relay 172 and the control panel 174 are separated and isolated from the bus work 161 and the network protector circuit breaker 128. The network protector circuit breaker 128 racks out on the one side 148. Otherwise, the network protector 118 is isolated within the network unit enclosure 102.

The optional controller 130 can optimize communications among the primary switch 110, network transformer 116, network protector 118, controller 130, and sensors 138,140, 142, and provide diagnostics and protection solutions.

The network unit 100 increases safety (e.g., the removable secondary circuit breaker 128 uses auto racking and eliminates bus exposure). The encapsulated and non-exposed secondary side bus work 166 between the network transformer 116 and the network protector 118 provides heat mitigation, since the overall bus work 161 is minimized and an isolated un-protective zone is provided by the draw-out circuit breaker 128. This increases reliability and reduces (e.g., without limitation, about 30% of the total man-hours) installation and maintenance costs.

The network protector relay 172 and the user interface control panel 174 for the controller 130 are isolated away from energized equipment exposure at open doors. For example, the network protector relay 172 and the controller 130 are separated and isolated from the removable secondary network protector circuit breaker 128, in order to provide safe customer access without exposure to the energized bus work 161.

The primary switch (e.g., vacuum circuit interrupter) 110, which is disposed on the relatively high voltage side of the network unit 100, eliminates the need for the rotary air switch 66 of FIG. 2.

The network unit 100 avoids the need for additional in vault equipment and avoids exposure of the energized bus work 161.

The network protector input 124 is electrically connected to the network transformer output 122 by the internal, encapsulated bus work 166. The first compartment 104 of the enclosure 102 encloses the bus work 161 from the exterior of the enclosure 102. This core, bus design configuration provides a bus work transition area, which is integral to the core of network transformer 116, such that there is no user exposure to the energized bus bars (not shown) of the bus work 161.

The bus work 161 is enclosed by the first compartment 104 and is preferably encapsulated. The first compartment 104 encloses the bus work 166, the second compartment 106 is isolated from the first compartment 104, and the third compartment 170 is isolated from the first compartment 104 and the second compartment 106. This maximizes compartmental separation since the circuit breaker 128 enclosed by the second compartment 106 is isolated from the encapsulated bus work 161 and the network transformer 116. Also, the controller 130, network protector relay 172 and the control panel 174, which are enclosed by the third compartment 170, are also isolated from the encapsulated bus work 161. Hence, there is no need to open a relatively large access door (not shown) to a network protector (e.g., 72 of FIG. 3). Instead, separate, area-reduced access doors 158,176 are provided to the respective network protector circuit breaker 128, and to the control panel 174 and network protector relay 172. When a user draws-out the circuit breaker 128, the only thing that the user sees and could hypothetically access are the recessed stabs 159 from the secondary side of the network transformer 116 and to the network fuses 132. The reduced and encapsulated bus work 161 is, however, removed from this area along with the control wiring (not shown) for the control panel 174. This precludes the possibility of a tool (e.g., without limitation, a wrench) (not shown) from being dropped into the bus work 161, which could cause an arc flash.

Since the control panel access door 176 is separated from the circuit breaker access door 158, the user can open the circuit breaker access door 158 at the side 148 (FIG. 7), go to the control panel 174 at the end 152 (FIG. 8), and press a button 175 to cause, for example, the automatic draw-out (e.g., un-racking) of the circuit breaker 128. Since remote draw-out is employed, this permits an operator to be safely away from the circuit breaker access door 158 during an arc flash that might occur when the circuit breaker 128 is drawn-out or drawn-in.

The disclosed network unit 100 significantly reduces the count of potential failure zones (e.g., provides seal integrity mitigation) from about nine areas to only three or four area-reduced zones). For example, a prior zone including the gasket 82 between the network protector 72 and the network transformer 50 of FIG. 3 is eliminated since the network protector 118 (FIGS. 5-7) is enclosed by the first compartment 104. Also, an access door (not shown) for the entire network protector 72 is eliminated and is replaced by the relatively smaller circuit breaker access door 158 for drawing-out the network protector circuit breaker 128.

For example, in known prior approaches, the network protector 72 (FIG. 3) is housed by a relatively large enclosure with an access door (not shown) to the network protector circuit breaker 78, network protector relay 80, bus work 76 from the secondary of the network transformer 50, and the output network bus (not shown). In the disclosed network unit 100, the bus work 161 is internal to the enclosure 102 and is enclosed by the first compartment 104. The network protector relay 172 and all associated controls (e.g., the controller control panel 174) are moved to the different third compartment 170, which is separate from the circuit breaker 128 and away from the bus work 161. The different second compartment 106 provides the user access door 158 to the circuit breaker 128, which is separated and isolated from the most-used, third compartment 170. Neither of the two access doors 158,176 provides access to the bus work 161. The bus work 161 is encapsulated within the first compartment 104, which receives input from the primary connection (e.g., three-phase) 108 and which outputs to the network protector low voltage bus (e.g., three-phase) 134.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A network unit comprising:
    an enclosure comprising a first compartment and a second compartment;
    a plurality of input terminals;
    a primary switch comprising an input and an output, the input of said primary switch being electrically connected to said input terminals;
    a network transformer comprising an input and an output, the output of said primary switch being electrically connected to the input of said network transformer;
    a network protector comprising an input, an output and a circuit breaker electrically connected between the input and the output of said network protector, the input of said network protector being electrically connected to the output of said network transformer;
    a plurality of circuit protection devices; and
    a plurality of output terminals, said circuit protection devices being electrically connected between the output of said network protector and said output terminals,
    wherein said circuit breaker is substantially enclosed by said second compartment, and
    wherein said network transformer, said primary switch and part of said network protector are enclosed by said first compartment.

2. The network unit of claim 1 wherein said enclosure further comprises a third compartment; wherein said network protector further comprises a controller and a network protector relay enclosed by said third compartment; wherein said controller comprises a control panel enclosed by said third compartment; and wherein said third compartment is user accessible.

3. The network unit of claim 1 wherein said circuit breaker is a draw-out circuit breaker comprising a cassette disposed in said second compartment, said cassette including a plurality of stabs extending into said first compartment; and wherein said second compartment and said draw-out circuit breaker are user accessible.

4. The network unit of claim 1 wherein said enclosure comprises an internal volume defined by a first side, an opposite second side, a first end disposed between the first side and the opposite second side, an opposite second end disposed between the first side and the opposite second side and opposite the first end, a top disposed above the first side, the opposite second side, the first end and the opposite second end, and a bottom disposed below the first side, the opposite second side, the first end and the opposite second end; wherein said input terminals are located on the first side; wherein the input of said primary switch is located within the internal volume and proximate the first side; and wherein said network transformer is below both of said primary switch and said network protector.

5. The network unit of claim 4 wherein said network protector is located within the internal volume and proximate the opposite second side.

6. The network unit of claim 5 wherein said circuit breaker is structured to be drawn-out of the opposite second side.

7. The network unit of claim 4 wherein said network protector further comprises a controller located within the internal volume and proximate the opposite second end.

8. The network unit of claim 7 wherein said controller comprises a control panel disposed proximate the opposite second end.

9. The network unit of claim 4 wherein said circuit protection devices and said output terminals are located proximate the top.

10. The network unit of claim 1 wherein said network protector further comprises a controller comprising at least one of a number of temperature sensors enclosed by said first compartment, a number of ground fault sensors enclosed by said first compartment and a number of arc sensors; and wherein said controller is structured to trip open said circuit breaker or said primary switch responsive to said at least one of said number of temperature sensors, said number of ground fault sensors and said number of arc sensors.

11. The network unit of claim 1 wherein said enclosure further comprises only three potential failure zones: a primary input at said input terminals; a network bus at said output terminals; and said second compartment for said circuit breaker.

12. The network unit of claim 1 wherein said enclosure further comprises a third compartment; wherein said network protector further comprises a controller comprising a control panel enclosed by said third compartment; and wherein said enclosure further comprises only four potential failure zones: a primary input at said input terminals; a network bus at said output terminals; said second compartment for said circuit breaker; and said third compartment for said control panel.

13. The network unit of claim 2 wherein said circuit breaker comprises a cassette disposed in said second compartment, said cassette including a plurality of stabs extending into said first compartment; wherein said second compartment is user accessible; and wherein said control panel is separated from said second compartment and is structured to cause said circuit breaker to be drawn-out of said second compartment.

14. The network unit of claim 1 wherein the input of said network protector is electrically connected to the output of said network transformer by bus work; wherein said first compartment is structured to enclose said bus work; and wherein said second compartment is substantially isolated from said first compartment.

15. The network unit of claim 1 wherein the input of said network protector is electrically connected to the output of said network transformer by bus work; and wherein said first compartment is structured to enclose said bus work from the exterior of said enclosure.

16. The network unit of claim 4 wherein said enclosure encloses a first bus work, which electrically connects the output of said primary switch to the input of said network transformer, a second bus work, which electrically connects the input of said network protector to the output of said network transformer, and a third bus work, which electrically connects the output of said network protector to said circuit protection devices.

17. The network unit of claim 16 wherein at least said first bus work and said second bus work are within the internal volume of said enclosure.

18. The network unit of claim 1 wherein said circuit protection devices are fuses.

19. The network unit of claim 1 wherein said network protector further comprises a controller comprising a number of sensors enclosed by said enclosure and structured to sense a number of fire protection, oil level, pressure and temperature conditions.

20. The network unit of claim 1 wherein said network protector further comprises a controller comprising a number of sensors enclosed by said enclosure and structured to sense a number of oil level, oil temperature, oil pressure conditions; and wherein said controller is structured to generate an alarm or a control action to said circuit breaker responsive to said conditions.

21. The network unit of claim 1 wherein the input of said network protector is electrically connected to the output of said network transformer by first bus work; wherein the output of said network protector is electrically connected to said circuit protection devices by second bus work; and wherein said first bus work and said second bus work are electrically isolated by insulative encapsulation.

22. A network unit comprising:
an enclosure comprising a first compartment and a second compartment;
a plurality of input terminals;
a network transformer comprising an input and an output, the input of said network transformer being electrically connected to said input terminals;
a network protector comprising an input, an output and a circuit breaker electrically connected between the input and the output of said network protector, the input of said network protector being electrically connected to the output of said network transformer;
a plurality of circuit protection devices; and
a plurality of output terminals, said circuit protection devices being electrically connected between the output of said network protector and said output terminals,
wherein said circuit breaker is substantially enclosed by said second compartment, and
wherein said network transformer and part of said network protector are enclosed by said first compartment.

23. The network unit of claim 22 wherein said enclosure further comprises a third compartment; wherein said network protector further comprises a controller and a network protector relay enclosed by said third compartment; wherein said controller comprises a control panel enclosed by said third compartment; and wherein said third compartment is user accessible.

24. The network unit of claim 22 wherein said circuit breaker is a draw-out circuit breaker comprising a cassette disposed in said second compartment, said cassette including a plurality of stabs extending into said first compartment; and wherein said second compartment and said draw-out circuit breaker are user accessible.

25. The network unit of claim 22 wherein said enclosure further comprises a third compartment; wherein said network protector further comprises a controller comprising a control panel enclosed by said third compartment; wherein said network protector further comprises a network protector relay enclosed by said third compartment; and wherein said enclosure further comprises only four potential failure zones: a primary input at said input terminals; a network bus at said output terminals; said second compartment for said circuit breaker; and said third compartment for said control panel and said network protector relay.

26. The network unit of claim 25 wherein said circuit breaker comprises a cassette disposed in said second compartment, said cassette including a plurality of stabs extending into said first compartment; wherein said second compartment is user accessible; and wherein said control panel is separated from said second compartment and is structured to cause said circuit breaker to be drawn-out of said second compartment.

27. The network unit of claim 22 wherein said network transformer is below said network protector.

* * * * *